United States Patent [19]
Woodford

[11] 3,955,134
[45] May 4, 1976

[54] REACTANCE CONTROLLER

[76] Inventor: Dennis A. Woodford, 981 McMillan Ave., Winnipeg, Manitoba, Canada

[22] Filed: Oct. 4, 1974

[21] Appl. No.: 512,355

[30] Foreign Application Priority Data
Oct. 9, 1973 United Kingdom............... 47049/73

[52] U.S. Cl................................ 323/61; 317/14 R; 323/109; 323/76; 323/81
[51] Int. Cl.² .......................................... G05F 5/00
[58] Field of Search ................. 323/6, 7, 8, 17, 18, 323/60, 61, 73, 74, 76, 79, 80, 81, 101, 102, 105, 109, 110, 120, 124; 317/14 R, 14 B, 16

[56] References Cited
UNITED STATES PATENTS

| | | | |
|---|---|---|---|
| 2,930,964 | 3/1960 | Goodman | 323/60 |
| 3,265,958 | 8/1966 | Seulen | 323/76 |
| 3,560,836 | 2/1971 | Lezan | 323/105 |
| 3,842,342 | 10/1974 | Friedlander et al. | 323/124 |

*Primary Examiner*—Gerald Goldberg
*Attorney, Agent, or Firm*—Stanley G. Ade

[57] ABSTRACT

The invention comprises a reactive device inserted within the secondary circuit of a power transformer connected to a AC transmission line which can be controlled in both inductive and compacitive modes with step changes being achieved by switching capacitors and/or inductors with suitable fast acting switches. If required, continuous changes in reactants, as for example, between switching steps, can be added by incorporating a saturated reactor or a thyristor controlled reactor.

12 Claims, 4 Drawing Figures

REACTANCE CONTROLLER

BACKGROUND OF THE INVENTION

This invention relates to new and useful improvements in the operation long distance high voltage alternating current power transmission.

The dominant parameters of an electric transmission line are, firstly, shunt capacitance distributed along the conductor to the ground and other nearby conductors and secondly, distributed series self and mutual inductance along the conductor. Consequently, when an electric transmission line is energized with AC voltage, electric current flows out from the conductor through the distributed shunt capacitance paths. In addition, when alternating current flows down a transmission line, the series inductance requires that reactive power (i.e. electric power in which current and voltage are ninety electrical degress out of phase so that no real power exists) must be generated to supply the reactive power loss in the series inductance. The reactive power loss due to the series inductance means that the AC voltage magnitude and phase along the line changes its profile. Furthermore, the current loss in the shunt capacitance results in a change in current being transmitted along the transmission line.

The changes in voltage and current on a transmission line can become extreme for very long distance transmission and can limit the amount of electric power that can be transmitted. In order that maximum electric power transmission can occur, AC voltage and current must remain closely in phase with each other and maintain approximately the same magnitudes along the transmission line.

To maintain voltages and currents near their desired magnitudes and phase relationship, various compensating devices are necessary. The present methods of compensation of AC transmission lines are as follows:

1. Shunt reactive compensation. At each end of the transmission line and sometimes at intermediate positions along the line, inductive reactors, and possibly capacitors also, are arranged for switching in shunt onto the line. When desired power transmission is small or at light load, the transmission line inherent distributed capacitance has a dominant effect which must be compensated by the shunt connected inductive reactors. When the power being transmitted is large, the inherent series inductance of the line is dominant and switching capacitors in shunt onto the line (with the shunt inductors switched off the line) will tend to compensate its effect. Thus, shunt compensation is one form of compensation essential for the steady state operation of long distance high voltage AC power transmission lines.

2. Series reactive compensation. An effective method of counteracting the inherent series inductance of an AC transmission line is to connect series capacitors into the line.

However, shunt and series compensation for AC transmission lines suffer from several inherent problems. Generally, the capacitors and inductors used for shunt compensation are connected to the transmission line by switches or circuit breakers. As the power transmitted is changed to a different value, the inductors or capacitors are switched on or off as required. This operation is satisfactory when steady power is being transmitted or, when power is changed slowly to a different level under the control of the power system operators. However uncontrolled power disturbances occur on a transmission line and may be of sufficient magnitude to cause synchronism to be lost between the ends of the transmission line resulting in disconnection of the line and total loss of power transmission.

Power transmission ceases until resynchronism is achieved and the transmission line is reconnected through its circuit breakers. Generally, shunt connected reactors and capacitors are unable to provide adequate compensation during uncontrolled power disturbances because of the inability to switch them fast enough in a controlled manner. Fast switching of capacitors and inductors is not generally practiced because firstly, high voltage circuit breakers or switches are economically not readily available for fast controlled repetitive operation. Secondly, fast repetitive switching of shunt capacitors and inductors will produce unwanted switching surges on the transmission line.

The main disadvantage of series compensation using series capacitors is the inability of the series capacitors to withstand overcurrents and power surges through the transmission line such as can occur with transmission line faults and uncontrolled power disturbances. Series capacitors are protected under these conditions by applying a short circuit across them. This action, unfortunately, results in reduced ability to maintain synchronism across the length of the transmission line. Further methods for compensating AC transmission lines are:

3. Saturated reactors. Iron cored reactors are subject to saturation, a property which can be used to advantage for shunt compensation. If a saturated reactor is connected in shunt to an AC transmission line, then it will automatically provide the necessary reactive power to compensate the line. It is essential that the reactor operate in saturation for any useful compensation. This forced saturation is achieved with capacitors also connected in shunt, or with the provision to be switched in if the reactor ceases to be saturated. The main advantage of the saturating property of shunt connected iron cored reactors is that the saturation forces the voltage of the AC transmission line (at the reactor terminals) to remain constant at the saturation voltage. Consequently, the desired phase and magnitude balance of current and voltage on the transmission line is preserved for maximum power transfer capability. Thus, saturated reactors with their associated capacitors can be distributed in shunt along the transmission line in order to preserve the necessary voltage and current profile along the line.

Another advantage of saturated reactor compensation is that the desired level of compensation almost instantaneously adjusts itself when changes in power transfer occur. Thus, the line is properly compensated during uncontrolled power disturbances which increases its ability to maintain synchronism between each end. A third advantage of saturated reactor compensation and shunt compensation in general is that short circuits and large current surges can be easily withstood, whereas series capacitor compensation mentioned previously is very vulnerable to these fault conditions.

Disadvantages of saturated reactor compensation are firstly, the saturating property of iron cored reactors creates current harmonics which are undesirable to AC transmission. These current harmonics can be controlled in two ways. One is to divert the harmonics with filters before they enter the transmission line, and the other way is with judicious winding on and construction of the iron core, so that circulating paths for the undesirable lower order harmonic fluxes can be provided.

Both methods for dealing with harmonics in saturated reactors increase its total cost. Secondly, the reactor must operate in the saturation mode which means that shunt capacitance may also be required when the transmission line is transmitting large power. The volt-amp rating of the saturated reactor must be large enough to compensate suitably the transmission line between no load operation and full load operation, as well as provide suitable extra compensation during power surges above full load. The combined rating of the associated shunt capacitors and saturated reactor will be quite large and expensive for most transmission line applications.

It should be mentioned that the saturated reactor rating can be reduced if provision is made to switch shunt capacitors and inductors in and out to just keep the reactor in its saturation mode. For example, at the operation of the transmission line at light load, the capacitors will be switched out so that the saturated reactor will operate as an inductor only. At full load transmission, all or most of the shunt capacitors would be switched in so that the effect of the saturated reactor plus capacitors would be capacitive; the saturated reactor still operates to maintain the transmission line volts at the saturated volts, but capacitors may be necessary to force the reactor into saturation and to supply the capacitive compensating reactive power needed for full power operation.

4. Thyristor controlled reactors and capacitors. It has been shown that dynamic shunt compensation of a transmission line requires variable inductive and capacitive devices. Two methods discussed so far have used firstly switches and secondly saturation property of iron cored reactors as a means of varying inductance and capacitance. Controlled rectifying devices such as silicon controlled rectifiers or thyristors can be used as switches to regulate the current through transformer taps, inductors and capacitors also. Thyristor regulation devices for AC voltage control are used in two ways: Firstly, to act as switches in either the "on" or "off" mode allowing all or none of the AC voltage cycle to pass to the inductors or capacitors. Secondly, to control the firing to the "on" state at each cycle or half cycle so that only a controlled portion of the AC voltage cycle passes to the inductors or capacitors.

Both methods of thyristor switching are effective means of controlling reactive power quickly. Disadvantages to this method of compensation control are:

1. Thyristor switching devices are expensive.
2. Filters would be necessary when thyristor firing is controlled to allow only a portion of the AC voltage cycle to pass.

5. Synchronous compensation. Another method for transmission line compensation is to use synchronous condensors which are alternating current rotating machines. Synchronous condensors normally generate reactive power in the inductive or capacitive mode which is controlled by adjustment of the machine's field current. Although a most useful transmission line compensating device, the synchronous condensor is restricted by the following disadvantages:

1. It is normally quite expensive.
2. It is subject to loss of synchronism under violent power disturbances.

3. It adds fault current during short circuits.

It will therefore be seen that the aforementioned systems suffer from disadvantages and this invention relates to a reactive controller to provide both steady state and dynamic compensation to AC transmission lines at an economically attractive cost.

SUMMARY OF THE INVENTION

The present object of the invention is therefore to provide a device of the character herewithin described which comprises essentially, a reactive device capable of being controlled in both the inductive and capacitive modes and in which step changes in reactance are achieved by switching capacitors and/or inductors with suitable fact acting switches.

A further object of the invention is to provide a device of the character herewithin described in which continuous changes in reactance, particularly between switching steps can be added using a saturated reactor or a thyristor controlled reactor. The size of a saturated reactor or a thyristor controlled reactor is, therefore, small when compared with the total range of reactance which can be switched in or out.

Another object of the invention is to provide a device of the character herewithin described which overcomes disadvantages inherent in conventional systems.

Still another object of the invention is to provide a device of the character herewithin described which is simple in construction, economical in manufacture and otherwise well suited to the purpose for which it is designed.

An object of the invention is to switch capacitors without creating undesired transient voltage surges on the transmission lines. A method is presented for minimizing transmission line voltage surges to a tolerable level when voltage compensating shunt capacitors are inserted by switching.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 5 is a block diagram which outlines the general technique for switching the inductors and/or capacitors of FIGS. 1, 2, 3 and 4 in and out of the secondary circuit.

In the drawings like characters of reference indicate corresponding parts in the different figures.

DETAILED DESCRIPTION

Figure 1:
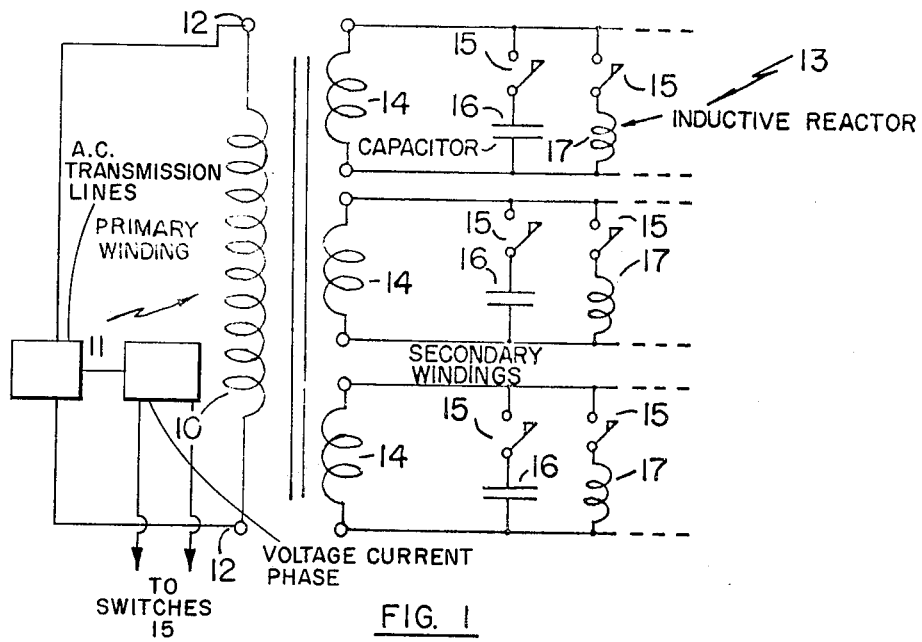
FIG. 1 shows a circuit diagram of the reactive controller including a simple arrangement of inductive capacitors and switches.

Before proceeding with the description of the circuitry, it should be stressed that a single phase example is shown, but the principles of operation can be equally applied to polyphase systems. In shunt applications, the reactor or reactors can either be connected line-to-ground or line-to-line.

Proceeding therefore to describe the invention in detail, reference to the drawings will show that a high voltage primary winding 10 of a power transformer 11 is connected to the alternating current transmission line (not illustrated) in a shunt arrangement at terminals 12. This transformer is designed with a secondary circuit 13 comprising one or more windings 14. The optimum voltage for the secondary windings 14 will depend on economic factors related to costs of switches, reactors and capacitors and will generally be of a lower voltage compared to the primary winding. The advantages of low voltage secondary windings are firstly, the inductors can be air cored reactors, and secondly, the switches operate at lower voltage and, consequently, their cost is minimized. Thus, by means of low voltage, large current, fast acting controlled switches 15, the capacitors 16 and/or inductive reactors 17 are switched into the secondary circuits as desired. This secondary reactance from the switched-in capacitors and/or inductive reactors is reflected through the transformer to the high voltage primary winding, thus acting as a direct reactance at the primary winding terminals 12.

The switching provides step changes in reactance. Continuously varying reactance between each step change is obtained using a continuously varying inductance or capacitance. The continuously varying reactance can be provided by saturated reactors and/or thyristor controlled inductors or capacitors or any continuously varying reactive device connected either in the secondary winding circuits or in direct shunt connection to the transmission line in parallel with the reactance controller. In this manner, high cost continuously varying reactance is minimized since its rating need only equal the size of the switched reactance step change.

In FIG. 1, a simple arrangement of inductive reactors 17 and capacitors 16 in the transformer secondary circuits 13 is shown for single phase representation. In fact, many combinations of switched capacitors and inductors are possible in the secondary circuits.

An essential feature of the reactance controller is the fast acting, low voltage, large alternating current controlled switch or circuit breaker 15. The requirement this switch must meet in its performance is the ability to operate without the electric arc limiting its performance. Various methods of switching without arc limitations are:
1. If the switch contacts can be made of arc resistant material.
2. Or operate the switch exactly on current zero so that no arc is formed.
3. Or use thyristors as switches thus eliminating moving contacts.
4. Or with a combination of mechanical switches and diodes, the switching operation can be performed so that diodes can divert or block the alternating current during the half cycle in which a mechanical switch is operated.

The large current, low voltage, fast acting switch is a technical possibility through use of one or more of the above mentioned methods of switching. However, it is sufficient for this description of the reactance controller that any suitably rated, fast acting, low voltage, large alternating current, controlled switch or circuit breaker will be adequate. By controlling when the switch is to open or close by an external signal, the sequence of switching the inductive reactors or capacitors in or out can be controlled as desired.

Figure 2:
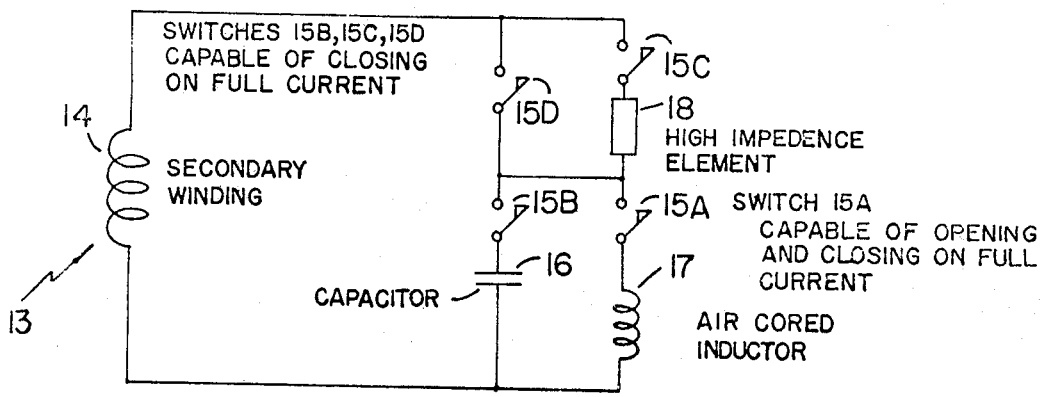
FIG. 2 shows a secondary winding portion with switching arrangements to minimize switching surges.

When capacitors 16 and inductors 17 are switched into alternating current circuits, transient switching surges of voltage and current can occur. By judicious arrangement of inductors, capacitors and suitably controlled switches, switching surges can be minimized. For example, in FIG. 2 a switching scheme for one secondary circuit 13 of the power transformer is shown. The inductor 17 is shown as air cored which has the advantage that no magnetic remanence can exist, and so on switching there is no magnetization current inrush as occurs with iron cored inductors. Thus, switching surges from the inductor 17 are minimized. An important feature of the circuit in FIG. 2 is that the air cored inductor 17 and the capacitor 16 are tuned to the alternating current frequency. The tuning of the inductor and capacitor to the AC frequency allows the capacitor to be switched into the circuit with minimum switching surge generated. A sequence of switching follows using the switches 15 and circuit of FIG. 2 and is one possible technique of inserting the capacitor 16. From the condition where the air cored inductance 17 only is in the circuit to the condition where the capacitor 16 is in the circuit only, a sequence is:

Initially, switches 15A and 15D are closed, 15B and 15C are open.
Step 1. Switch 15A is opened to remove the inductor 17 from the circuit.
Step 2. Switch 15D is opened and switch 15C is closed. Thus, the inductor 17 and capacitor 16 can only be connected into the secondary circuit through switch 15C and a high impedance device 18.
Step 3. Switches 15A and 15B are closed connecting both the air cored inductor 17 and capacitor 16 to the circuit. The high impedance element 18 acts to inhibit any switching surges from the capacitor 16.
Step 4. Because the inductor 17 and the capacitor 16 are tuned to the alternating current frequency, the AC voltages across the high impedance device 18 reduces to near zero. At this stage, switch 15D can be closed and the inductor 17 and the capacitor 16 are completely connected across the secondary winding 14 of the power transformer.
Step 5. Switch 15A is opened removing the inductor 17 so that only the capacitor 16 remains in the circuit.

A similar sequence exists for removing the capacitor 16 from the circuit so that only switch 15A is required to break the full load current. This sequence briefly is:
Step 1. Close switch 15A.
Step 2. Open switch 15D and switch 15C.
Step 3. Open switch 15A.
Step 4. Open switch 15B.

These sequences are indicative of the procedures for switching in or out capacitors and inductors so that switching surges are minimized. Important factors relating to this technique are:
1. The inductor 17 can either be totally or partially air cored. However, the less iron in the magnetic circuit, the less magnetizing inrush current on switching on, and the less transient switching surge.
2. More than one inductor and capacitor switching circuit as shown in FIG. 2 can be built onto a secondary winding 14.

3. Only one switch (see switch 15A in FIG. 2) need be built capable of opening on full current for the one inductor and capacitor switching circuit.

Figure 3:
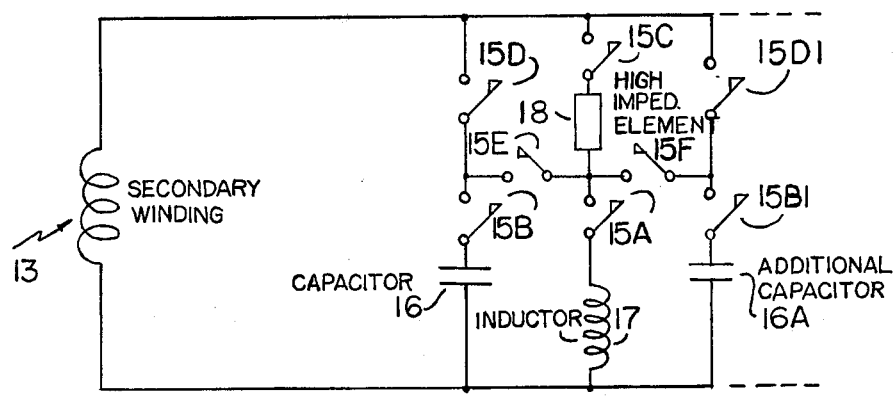
FIG. 3 is a view similar to FIG. 2, but showing added additional capacitors which can be sequentially switched into secondary circuit with minimum switching surge.

4. If more capacitive reactance than inductive reactance is required of the reactance controller, a switching arrangement can be added to the circuit shown in FIG. 2 whereby additional capacitance can be switched into the secondary circuit in steps without the need of additional inductor for each step. See FIG. 3 where an additional capacitor 16A can be switched in using the inductor by isolating capacitor 16 by switch 15E and closing switch 15F. Providing capacitor 16A is tuned with the inductor 17 to the AC frequency, the same procedure for its connection applies as for connecting capacitor 16. This technique can apply to any number of capacitors providing they are sequentially switched in or out.

Figure 4:
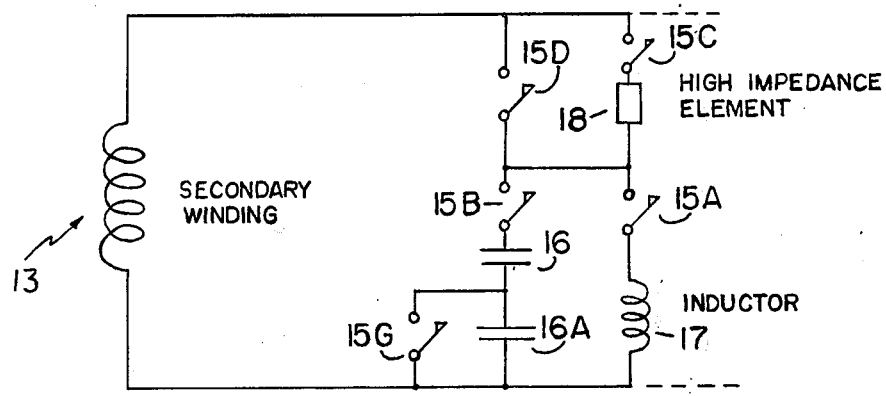
FIG. 4 is a view similar to FIGS. 2 and 3, but showing a circuit for increasing capacitor reactance.

5. Another technique for increasing the amount of capacitive reactance is illustrated in FIG. 4. With switch 15G open the total capacitance of 16 and 16A must be tuned with the inductor 17 to the AC frequency. Once the capacitors 16 and 16A are connected into the secondary circuit through switches 15B and 15D, and with switch 15A open, the closing of switch 15G places only capacitor 16 in the circuit which is effectively an increase in capacitive reactance. However, switch 15G must be capable of conducting the discharge current of capacitor 16A when it is closed. This technique is useful if extra capacitive reactance is required for only a short duration, allowing capacitor 16 to be transiently overloaded.

It is sufficient to say that additional techniques for switching capacitors and inductors are possible with varying degrees of surge suppression capability. The techniques described herein are most useful for maximum surge suppression when capacitors and inductors are switched.

For the reactance controller to be effective, the switching of inductors and capacitors must be operated in a controlled manner. For example, if the power flow through an AC transmission line starts to increase, the reactive power controller can begin to switch in shunt capacitors. Thus, one method of control is to operate the sequence of switching according to the power flow through the transmission line so that at small power flow, the reactance controller will tend to be inductive and for large power flows, the reactance controller will tend to be capacitive.

Another method of control would be to measure voltage on the transmission line at the reactance controller terminals. As power flow increases, voltage tends to reduce. The reactance controller can, therefore, act to switch in more capacitance if it senses a voltage reduction, or if it senses a voltage rise, switch out capacitance and add inductance in order to keep the transmission line nearly constant.

A third method of control is to sense transmission line current and switch in more capacitance as current increases and more inductance as current reduces. It is possible that power, voltage, and current will all be used to determine the optimum sequence of control for the reactance controller.

In order to appreciate the general form of the controls necessary in the operation of the capacitor and inductor switching of the reactance controller, the block diagram of FIG. 5 indicates how measured values of transmission line power, AC volts and current are used with standard control techniques in controlling switching operations.

However as these various methods of operating the controller are well known, it is not believed necessary to describe same in this specification.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A reactance controller for incorporation in the secondary circuit of a power transformer which includes a secondary winding, said power transformer having a primary winding connected to an alternating current transmission line; comprising in combination means to control said controller in both the inductive and capacitive modes, said means including at least one capacitor and at least one inductor and switch means to switch said inductor and said capacitor together and separately in and out of the secondary circuit responsive to variations in voltage, current and phase of the AC current in said transmission line and means to minimize switch surges in said secondary circuit, said last mentioned means including a first conductor across said secondary winding, a capacitor connected in series with said conductor, a first switch and a second switch in said conductor on one side of said capacitor, a second conductor across said secondary winding, a high impedance element and an inductive reactance in series within said second conductor, a third switch between said high impedance element and one side of said secondary coil, fourth switch means between said high impedance element and said inductive reactor, and a third conductor connected between said first and second conductors, and being connected to said first conductor between said first and second switches and to said second conductor between said high impedance element and said inductive reactance.

2. The controller according to claim 1 which includes a plurality of said reactance controllers incorporated in said secondary circuits thereby giving step changes in reactance applied to said transmission line, said secondary circuit including a plurality of secondary windings in said power transformer, each winding having a reactance controller operatively connected thereto.

3. The controller according to claim 2 which includes means to insert additional capacitance sequentially into said secondary circuit, said last mentioned means including a further conductor across said secondary winding, a further capacitor in said fourth conductor, first and second switches in series with said further conductor on one side of said further capacitor and a fourth conductor between said second conductor and said further conductor, said fourth conductor being connected to said second conductor between said high impedance element and said fourth switch and to said further conductor between said first and second switches of said further conductor.

4. The controller according to claim 3 which includes means in secondary circuit for increasing capacitive reactance thereto, said last mentioned means including a second capacitor in said first conductor in series with said first capacitor, and a bridging conductor connected by one end thereof to said first conductor between said first and second capacitors, and by the other end thereof to the other side of said first capacitor, and a switch in said bridging conductor.

5. The controller according to claim 2 which includes means in secondary circuit for increasing capacitive reactance thereto, said last mentioned means including a second capacitor in said first conductor in series with said first capacitor, and a bridging conductor connected by one end thereof to said first conductor between said first and second capacitors, and by the other end thereof to the other side of said first capacitor, and a switch in said bridging conductor.

6. The controller according to claim 2 which includes means to give continuous changes in reactants between step changes.

7. The controller according to claim 6 which includes means to insert additional capacitance sequentially into said secondary circuit, said last mentioned means including a further conductor across said secondary winding, a further capacitor in said fourth conductor, first and second switches in series with said further conductor on one side of said further capacitor and a fourth conductor between said second conductor and said further conductor, said fourth conductor being connected to said second conductor between said high impedance element and said fourth switch and to said further conductor between said first and second switches of said further conductor.

8. The controller according to claim 7 which includes means in secondary circuit for increasing capacitive reactance thereto, said last mentioned means including a second capacitor in said first conductor in series with said first capacitor, and a bridging conductor connected by one end thereof to said first conductor between said first and second capacitors, and by the other end thereof to the other side of said first capacitor, and a switch in said bridging conductor.

9. The controller according to claim 6 which includes means in secondary circuit for increasing capacitive reactance thereto, said last mentioned means including a second capacitor in said first conductor in series with said first capacitor, and a bridging conductor connected by one end thereof to said first conductor between said first and second capacitors, and by the other end thereof to the other side of said first capacitor, and a switch in said bridging conductor.

10. The controller according to claim 1 which includes means to insert additional capacitance sequentially into said secondary circuit, said last mentioned means including a further conductor across said secondary winding, a further capacitor in said fourth conductor, first and second switches in series with said further conductor on one side of said further capacitor and a fourth conductor between said second conductor and said further conductor, said fourth conductor being connected to said second conductor between said high impedance element and said fourth switch and to said further conductor between said first and second switches of said further conductor.

11. The controller according to claim 10 which includes means in secondary circuit for increasing capacitive reactance thereto, said last mentioned means including a second capacitor in said first conductor in series with said first capacitor, and a bridging conductor connected by one end thereof to said first conductor between said first and second capacitors, and by the other end thereof to the other side of said first capacitor, and a switch in said bridging conductor.

12. The controller according to claim 1 which include means in secondary circuit for increasing capacitive reactance thereto, said last mentioned means including a second capacitor in said first conductor in series with said first capacitor, and a bridging conductor connected by one end thereof to said first conductor between said first and second capacitors, and by the other end thereof to the other side of said first capacitor, and a switch in said bridging conductor.

* * * * *